UNITED STATES PATENT OFFICE.

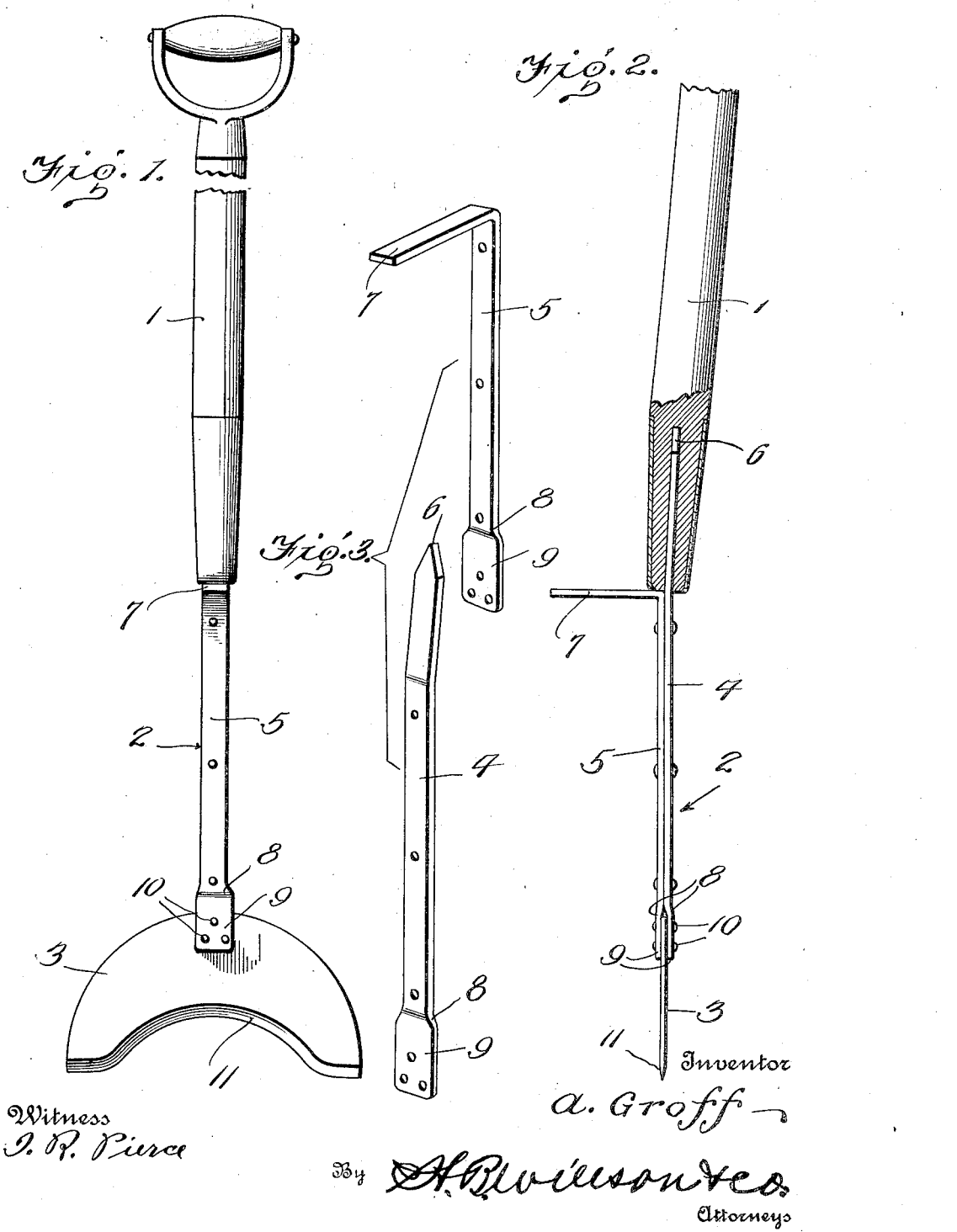

ANTONIO GROFF, OF RIDGWAY, COLORADO.

HAY CUTTER.

1,427,733.

Specification of Letters Patent. Patented Aug. 29, 1922.

Application filed July 14, 1921. Serial No. 484,728.

*To all whom it may concern:*

Be it known that I, ANTONIO GROFF, a citizen of Tyrol, Italy, residing at Ridgway, in the county of Ouray and State of Colorado, have invented certain new and useful Improvements in Hay Cutters; and I do declare the following to be a full, clear, and exact description of the invention, such as will enable others skilled in the art to which it appertains to make and use the same.

This invention relates to an improved implement which is designed for cutting hay, being of course adaptable for other uses.

The principal object of the invention is to provide a novel hay cutter which is an improvement upon prior patented and marketed devices, the same being extremely simple in construction, strong, durable, and such that it can be easily and readily manipulated for effectively cutting hay and the like.

Another object of the invention is to provide a cutter of this class which embodies a blade, the cutting edge being substantially semi-circular so when it is forced down onto the hay, it serves to bunch the latter so that it can be more easily cut.

Another object of the invention is to provide an implement of this class which embodies a wooden handle or the like having a socket in its lower end, a shank, and a blade carried by the latter, the shank being made up of two flat metal bars secured together intermediate their ends, one of the bars having its upper end extending into said socket and the other bar having its corresponding end bent at right angles to simultaneously provide a shoulder for the lower end of the handle and a foot-piece by means of which the implement is manipulated.

Other objects and advantages of the invention will be apparent during the course of the following description.

In the accompanying drawing forming a part of this specification and in which like numerals are employed to designate like parts throughout the same:

Figure 1 is a front elevational view of a hay cutter constructed in accordance with this invention.

Figure 2 is a side elevational view thereof showing the manner in which the shank is connected with the handle.

Figure 3 is a perspective view of details of the cutter disconnected.

Referring to the drawing by numerals, 1 designates a suitable handle which is provided at its lower end with a centrally disposed socket. 2 designates the shank referred to and 3 designates the cutting blade. As before pointed out, this shank 2 by preference, is composed of two flat metal bars 4 and 5 respectively, these two bars being secured together intermediate their ends as indicated. The upper end of the bar 4 is slightly offset and pointed as indicated at 6 and this end extends into the socket in the handle and is secured in place by driving the point 6 into the inner end of the socket in the handle. The corresponding end of the bar 5 is directed laterally or at right angles to the bar 4 as indicated at 7 and this angularly disposed portion constitutes a combined foot piece and shoulder on which the lower end of the handle 1 rests, as better shown in Fig. 2. Referring to the opposite ends of these bars, it will be seen that each is offset in opposite directions as indicated at the point 8 and these ends are slightly widened to provide what may be termed ears 9. These ears are provided with apertures for passage of the rivets or other fastenings 10 which pass through them and through the blade 3 which is positioned between the ears and held in place. At this point, I wish to direct attention to the fact that the cutting edge 11 of the blade 3 is curved in such a way that when it is forced down on the material to be cut, it causes the latter to ride inwardly toward the center of the blade so that it becomes bunched and rendered sufficiently compact to permit it to be more easily and readily severed.

The use of the implement is well known and the foregoing description taken in connection with the drawing will be found sufficient to enable the reader to obtain a clear understanding of the same. In view of this, a more lengthy and detailed description is thought unnecessary.

I claim:

A hay cutter comprising a handle having a centrally disposed socket formed in its lower end, a pair of metal bars secured together between their ends, the upper end of one bar being pointed and extending into the socket in said handle and the corresponding end of the other bar being bent out at right angles from said first bar to provide a foot-piece and a shoulder for the lower end of the handle to rest on, and a cutting blade secured between the lower ends of said bars.

In testimony whereof I have hereunto set my hand.

ANTONIO GROFF.